Nov. 28, 1944.  W. HARDWARE  2,363,587
INTERNAL GAUGE FOR BORES
Filed Aug. 3, 1943  3 Sheets-Sheet 1
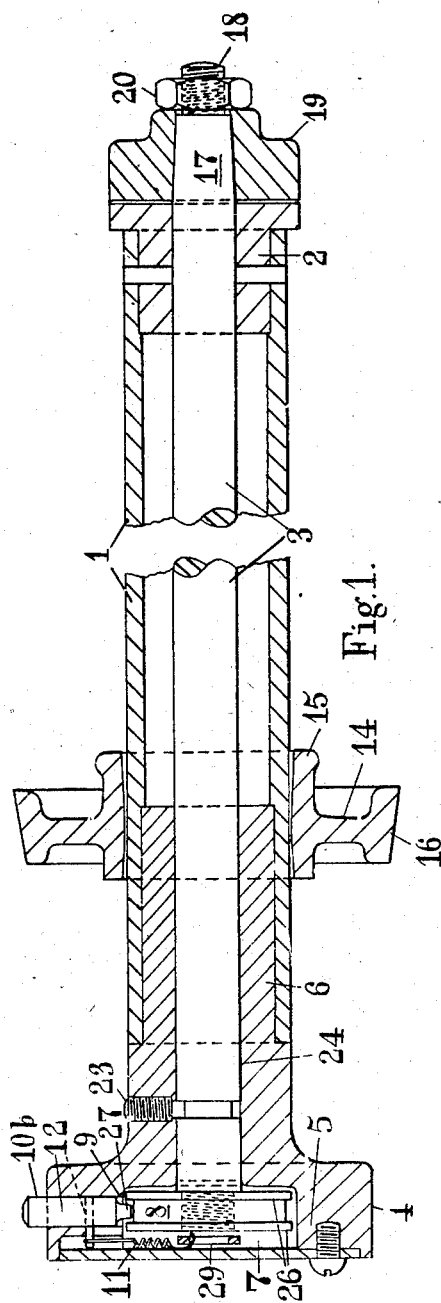
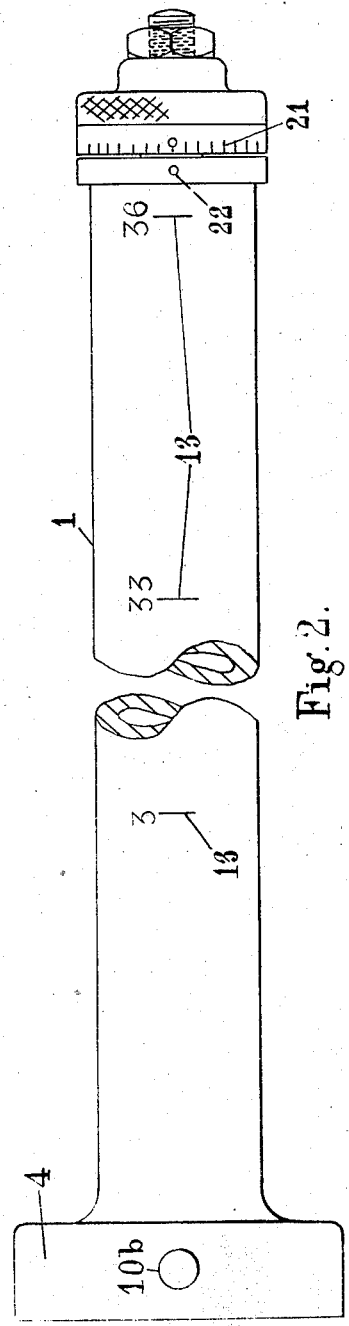
Inventor
W. Hardware
By Glaser & Downing & Schild
Attys Inventor
W. Hardware Nov. 28, 1944.   W. HARDWARE   2,363,587
INTERNAL GAUGE FOR BORES
Filed Aug. 3, 1943   3 Sheets-Sheet 3

Inventor
W. Hardware
By Glascock Downing Suchted
Attys.

Patented Nov. 28, 1944

2,363,587

UNITED STATES PATENT OFFICE 2,363,587

INTERNAL GAUGE FOR BORES

Walter Hardware, Peterborough, England

Application August 3, 1943, Serial No. 497,233
In Great Britain August 4, 1942

7 Claims. (Cl. 33—178)

This invention relates to internal gauges for gauging or measuring the diameter of parallel or tapered bores or other bores, particularly long bores such as for recoil or recuperator cylinders or bores for guns or for gun or like barrels, the invention being especially useful for gauging or gauge checking during machining operations.

An object of the present invention is to provide a device for accurately gauging bores at any longitudinal position within the bore, the dimensions of the bore being determined progressively or otherwise at selected longitudinal distances and read externally of the bore by aid of calibrations indicating radial or diametric measurements and the longitudinal position of such measurements.

This invention consists in an internal gauge for bores comprising a tube, a spindle mounted within the tube and coaxial therewith, said tube and spindle being capable of relative rotary movement, a gauging head mounted upon the tube at one end thereof, said head having three spaced plain radial holes, feeler pins mounted in said holes, one of said pins being radially adjustable for gauging purposes, the other pin being fixed relatively to said adjustable pin, a pin operating element mounted on the spindle to be rotatable therewith, said element comprising a snail cam engaging the adjustable feeler pin, and a laterally adjacent cylindrical portion engaging the relatively fixed pins.

In the accompanying drawings:

Figure 1 is a longitudinal section of the improved gauge;

Figure 2 is an outside view;

Figure 3:
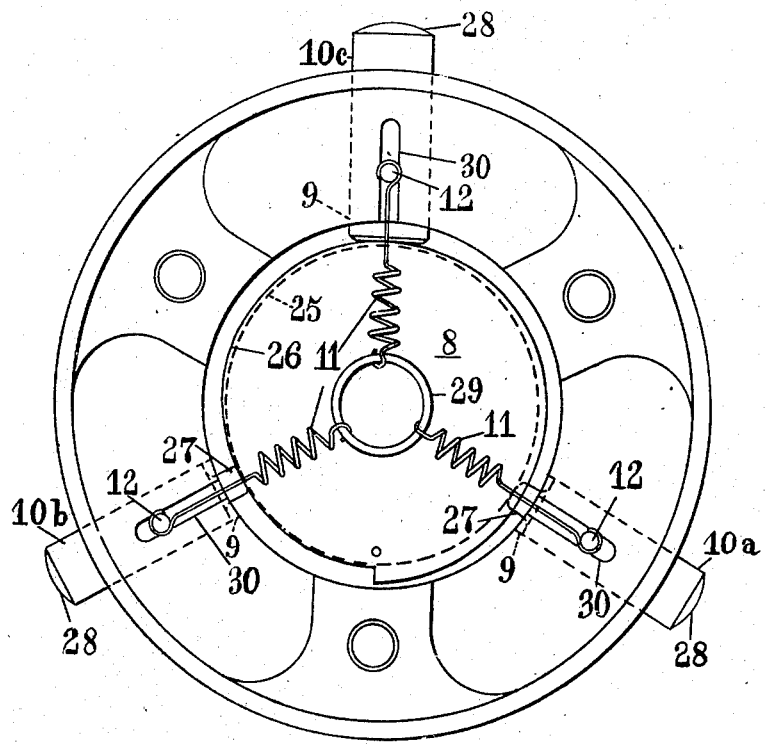
Figure 3 is an end view on an enlarged scale.
Figure 4:
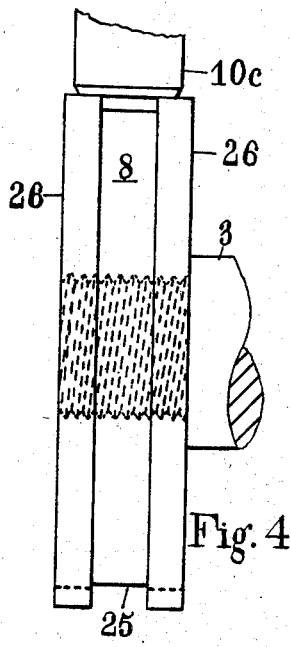
Figures 4 and 5 are detail views of a cam.
Figure 5:
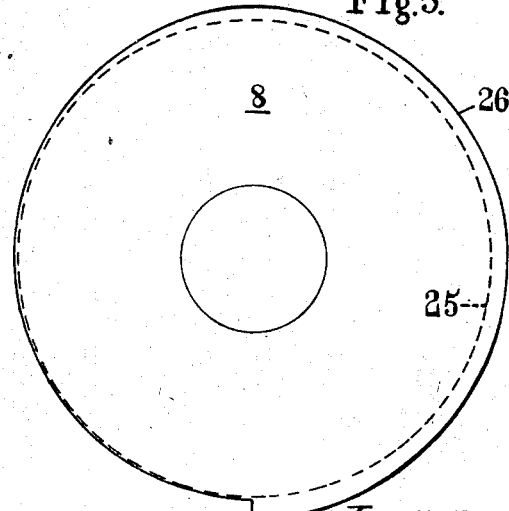

In carrying the invention into effect according to one convenient mode as applied by way of example to a gauge device for gauging a recuperator bore, a tube 1 of appropriate length has mounted at one end a plug or bushing 2 through which a bore is provided rotatably to accommodate an operating rod or spindle 3 described below. The other end of the rod has a gauging head 4 comprising a cylindrical or housing element 5 provided with a rearwardly extending sleeve or bushing 6 in which the rod 3 is rotatably mounted but which is capable of a limited axial displacement therein for adjustment purposes. The forward end of the head 4 is provided with a cavity 7 adapted to receive a pin operating ring or disc 8 or like element carrying cam means. This element 8 is fixed on the end of the rod 3. In the wall of the head 4 surrounding the operating element 8 three radial bores 9 are provided at 120° (or other suitable angle) to one another for the reception of feeler pins 10a, 10b, 10c, the bores affording a sliding fit for the pins to enable them to be displaced radially in the head when taking a gauge reading. The pins 10a, 10b, 10c are prevented from rotation about their own axes and are under the influence of springs 11 adapted to tend to thrust them inwardly towards the axis of the tube. For example, the outer side wall of each bore 9 may have a radial slot 30 through which a guide pin 12 fixed in the side of each feeler pin 10a, 10b, 10c is adapted to slide and which serves as a connection for one end of a tension spring 11 located radially of the head and which is attached to a ring 29 or other anchorage adjacent the centre of the element 8.

Upon the outer surface of the tube 1 a locating guide ring 14 is provided comprising a sleeve 15 within which the tube is slidable and an outer periphery 16 of frusto-conical or tapered form so that it may be fitted into the end of the bore to be gauged, the arrangement being such that when the guide ring 14 is in position the tube 1 may be slid longitudinally within the sleeve and the depth or longitudinal position of the gauging head 4 determined by reference to calibrations marked longitudinally on the outside of the tube.

Coaxially of the tube 1, the spindle or rod 3 referred to above is located, the outer end of which passes through the plug 2 in the outer end of the tube and terminates in a taper 17 and screw thread 18. A manipulating ring 19 is tightly fitted on the taper portion 17 and secured by means of a lock nut 20, the taper formation enabling the manipulating ring 19 to be initially adjustable angularly with respect to the rod 3. The outer surface of the ring 19 is conveniently milled for manipulating purposes and calibrations 21 are provided upon it or upon the adjacent end plug of the tube and a zero or datum mark 22 is provided upon the one or the other.

The inner end of the rod 3 is rotatably mounted within the sleeve of the head 4 and secured longitudinally by a grub screw 23 engaging with a groove 24 in the outer surface of the rod 3. The operating ring or element 8 has a plain cylindrical portion 25 coaxial with the rod 3 and on either side of this cylindrical portion a cam 26 is positioned flangewise, the cams being of the snail type extending over 360°, that is to say, each cam has a continuous curve which commences at zero at the same or substantially the same radius as the plain cylindrical part 25 while the maximum throw at the terminal step of the cam is located adjacent and upon the other side of the zero position.

Of the three feeler pins that are located in the bores in the gauging head 4, two 10a, 10b are provided with inner reduced ends 27 adapted to ride upon the plain cylindrical portion 25 and are held against this portion by the springs 11, while the third pin 10c bridges the plain portion 25 and rides upon the cam flanges 26. The outer or sensitive end 28 of each pin is a part of a sphere or is conical and the adjustment of the cam-controlled pin 10c displaces the head 4 slightly and centres the ends of the three pins.

It will be appreciated that by rotating the calibrated manipulating ring 19 at the outer end of the device the rod 3 is turned within the tube 1. Rotation counerclockwise (looking a the device from the outer end) causes the cam feeler pin 10c to be thrust radially outward by the cams 26 and when the direction of rotation of the manipulating ring 19 is reversed this pin will be retracted by its spring 11. The other two pins 10a, 10b are not directly affected by the rotation of the cams.

In operation, assuming the locating and guide ring 14 to be positioned within the bore mouth, the gauging head 4 may be slid longitudinally within the bore to the desired depth, which may be gauged against the longitudinal calibrations 13 on the outer side of the tube 1. The diameter gauged at this setting may then be read by rotating the manipulating ring 19 causing the displacement of the cam pin 10c. The thrust of the cam pin against the wall of the bore will cause the other two pins 10a, 10b to engage the wall of the bore and the three pins will accommodate themselves to the circumference of the bore, and the diameter is read off on the calibrations at the manipulating ring 19. When it is desired to gauge the diameter at another longitudinal position the manipulating ring 19 is reversed to retract the cam controlled pin 10c and the gauge is then slid longitudinally to the next position at which the gauging operation is to take place, after which the manipulating ring 19 is rotated, as before, to bring the feeler pins into contact with the surface to be gauged and measure the contiguous circle common to the sensitive ends of the pins.

Figure 6:
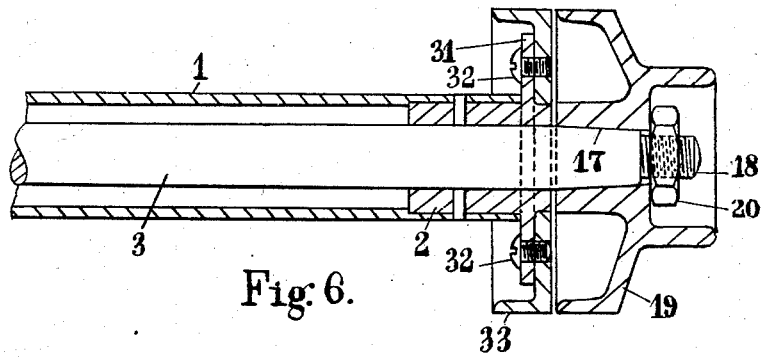
Figures 6 and 7 are details of a modified arrangement of manipulating head.
Figure 7:
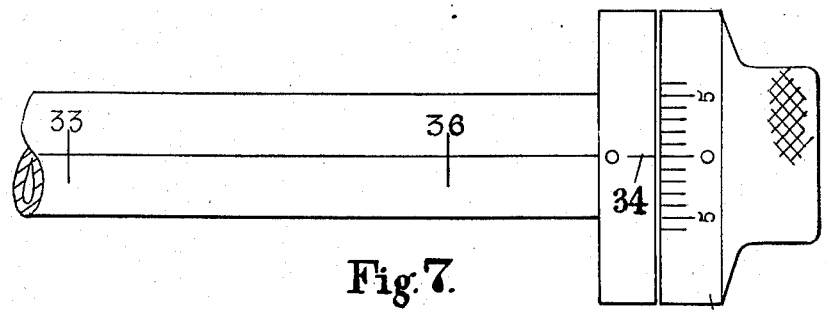

According to a modified form of manipulating means, see Figures 6 and 7, the plug 2 is provided with a flange 31 to which is secured in an angularly adjustable manner by means of screws 32 in arcuate slots, a zero disc 33. The zero disc carries a zero or datum mark 34 against which calibrations on the manipulating head 19 are read. Should wear or other conditions arise the zero disc 33 can be slackened from the tube flange 31 and the zero mark 34 brought again into register with the zero mark on the manipulating head 19 after which the zero disc is again locked to the flange 31 by the screws 32.

Figure 8:
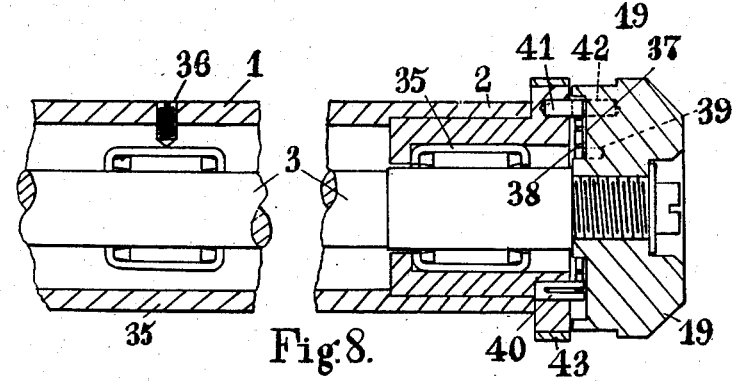
Figures 8 and 9 are details of a manipulating head incorporating a returning spring.
Figure 9:
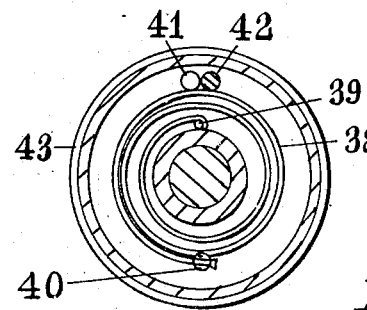

Referring to Figures 8 and 9, the rod 3 may be mounted in anti-friction bearings such as needle bearings 35 located at spaced points in the tube 1 and bushing 2. The bearings in the tube 1 may be supported by screws 36. The gauging head 4 may also have needle bearings or ball bearing support. The manipulating ring 19 is recessed at 37 to accommodate a spiral returning spring 38 the ends of which are secured respectively to the ring 19 by a pin 39 and to the bushing 2 by a split pin 40.

By the provision of the returning spring 38, after taking a reading and releasing the manipulating ring 19, the ring automatically returns to the zero position so that the feeler pin is retracted thus avoiding damage to the pin or to the bore being gauged, such an might occur where an operator forgets to turn the manipulating ring in the reverse direction. Stop pins 41, 42 carried by the bushing 2 and manipulating ring 19 limit the return or zeroising movement. The flange of the bushing 2 may be provided with an adjustable zero band 43 for adjusting the zero mark as in the case of the disc 33 (Figure 6).

I claim:

1. An internal gauge for bores, comprising a tube, a spindle mounted within the tube and coaxial therewith, said tube and spindle being capable of relative rotary movement, a gauging head mounted upon the tube at one end thereof, said head having three spaced plain radial holes, feeler pins mounted in said holes, one of said pins being radially adjustable for gauging purposes, the other pins being fixed relatively to said adjustable pin, a pin operating element mounted on the spindle to be rotatable therewith, said element comprising a snail cam engaging the adjustable feeler pin, and a laterally adjacent cylindrical portion engaging the relatively fixed pins.

2. An internal gauge for bores, comprising a tube, a spindle mounted within the tube and coaxial therewith, said tube and spindle being capable of relative rotary movement, a housing mounted upon the tube at one end thereof, said housing having three spaced plain radial holes, feeler pins mounted in said holes, one of said pins being radially adjustable for gauging purposes, the other pins being fixed relatively to the adjustable pin, a pin operating element mounted on the spindle to be rotatable therewith, said element being located within the housing and comprising a pair of axially spaced snail cams engaging the adjustable feeler pin and a cylindrical portion located between the cams and engaging the relatively fixed pins.

3. An internal gauge for bores as claimed in claim 2, wherein the cams extend over 360°.

4. An internal gauge for bores as claimed in claim 2, wherein spring means are provided for holding the pins on the cams and said cylindrical portion, said spring means comprising a plurality of coiled springs connected by one of the ends to the pins, the other ends being connected to a common ring.

5. An internal gauge for bores, as claimed in claim 2, wherein the tube is provided with longitudinally extending depth calibrations.

6. An internal gauge for bores as claimed in claim 2, wherein the spindle at its outer end is provided with a manipulating knob calibrated for rotary movement and the tube is provided with an angularly adjustable zero ring adjacent said knob.

7. A internal gauge for bores as claimed in claim 2, wherein the spindle at its outer end is provided with a manipulating knob calibrated for rotary movement, a returning spring between the knob and the tube stressed by a calibrating movement of the knob, said spring returning the parts to zero when the knob is released.

WALTER HARDWARE.